UNITED STATES PATENT OFFICE.

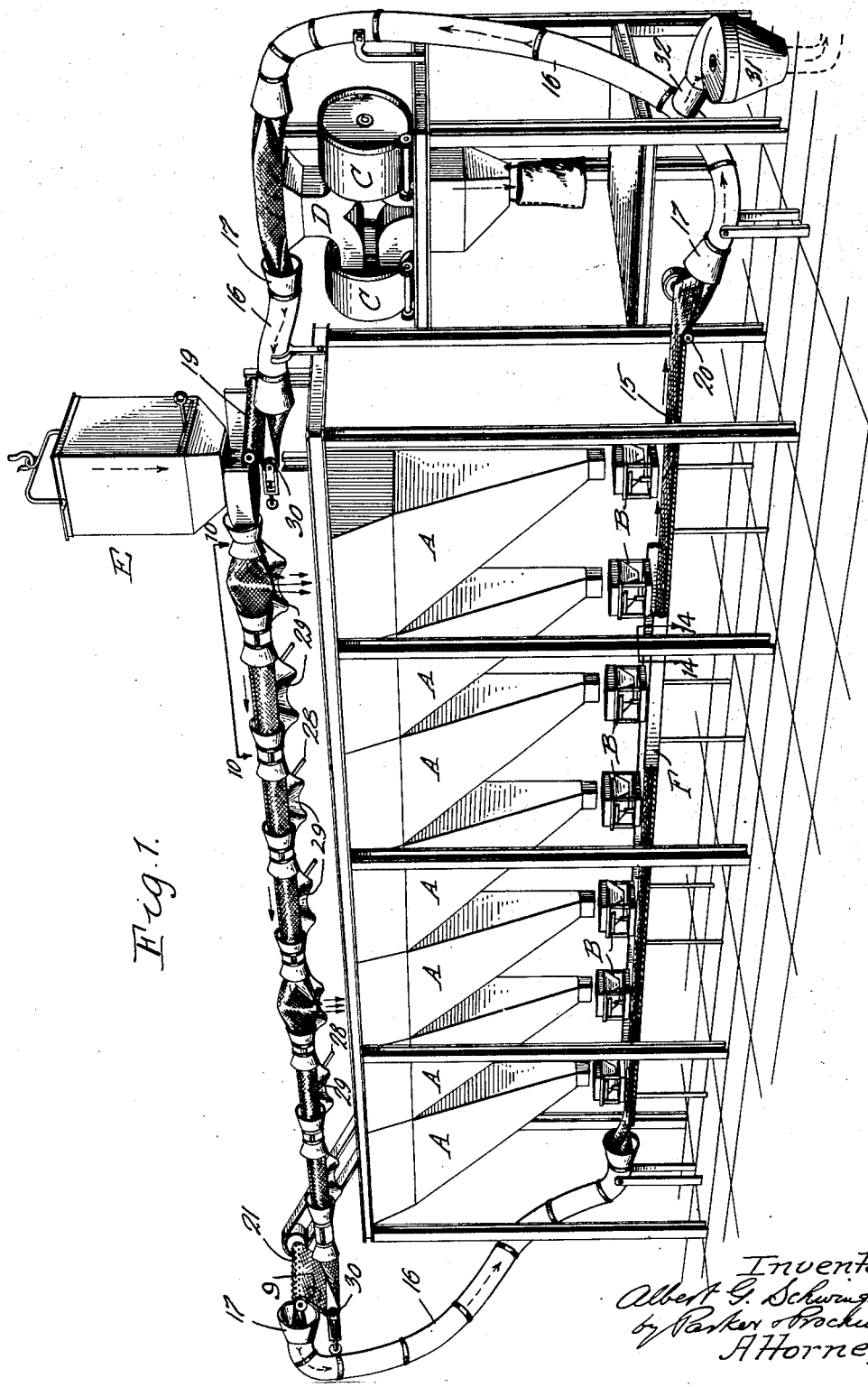

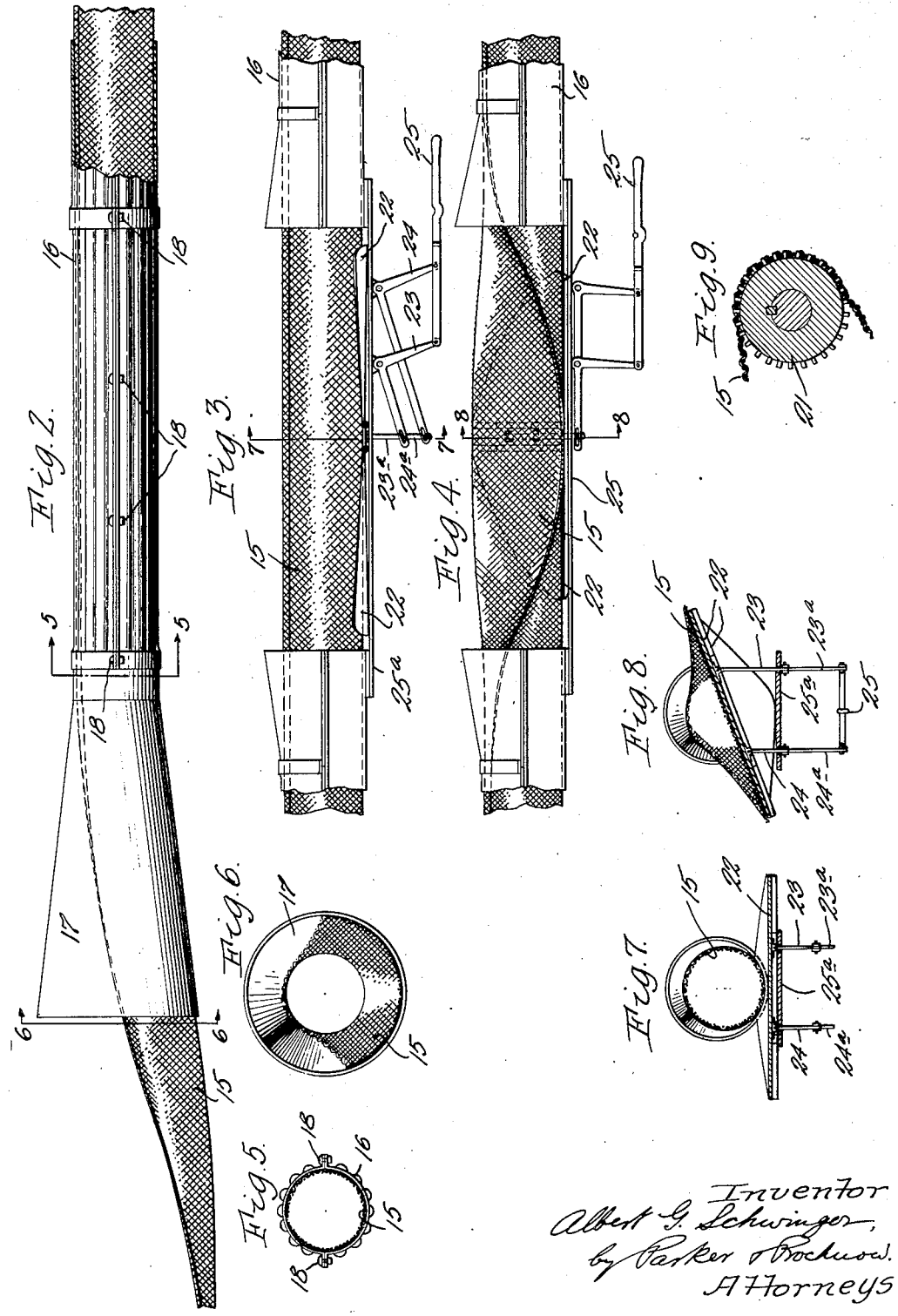

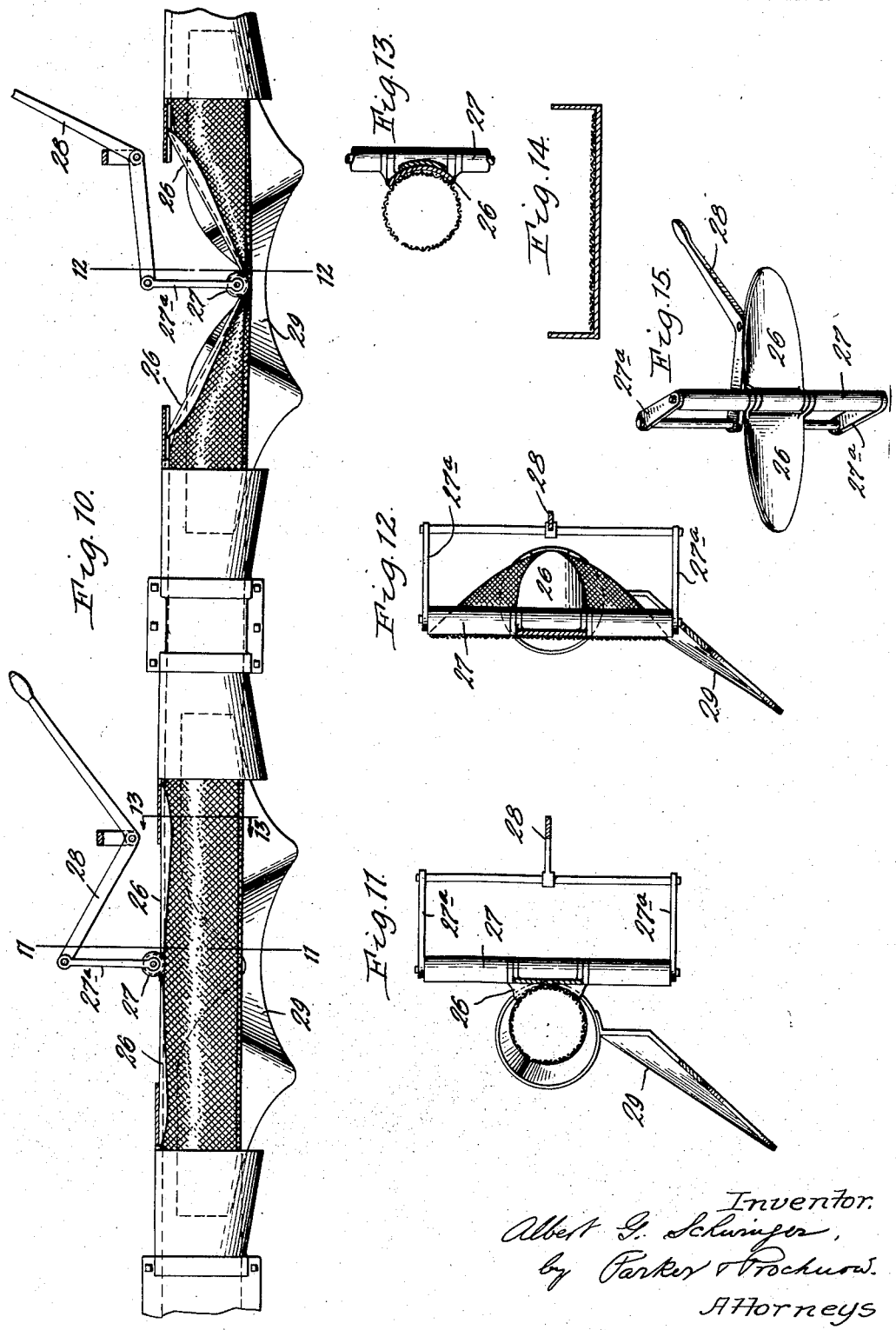

ALBERT G. SCHWINGER, OF NIAGARA FALLS, NEW YORK.

CONVEYER.

1,427,553.  Specification of Letters Patent.  Patented Aug. 29, 1922.

Application filed November 1, 1921. Serial No. 512,110.

*To all whom it may concern:*

Be it known that I, ALBERT G. SCHWINGER, a citizen of the United States, residing at Niagara Falls, in the county of Niagara and State of New York, have invented a new and useful Improvement in Conveyers, of which the following is a specification.

This invention relates to conveyers and in particular to conveyers adapted to be used for granular, lumpy or flocculent material.

Heretofore in the handling of certain materials, such for example as coal, lime, ashes, ore, calcium, carbide or the like, it has been customary to employ belt or drag conveyers for transporting the material in horizontal flights and in order to elevate the material or to raise it to any height, it has been necessary to employ bucket elevators or the like. In such handling, the material is subjected to more or less severe jostling and handling which tends to break or reduce the material from its original form or size, in cases such, for example, as when the material is discharged from a horizontal conveyer into an elevator boot and is from there taken up by the elevator buckets or skips and discharged from the elevator buckets. This shifting or dumping of the material from a conveyer to an elevator or from one form of conveyer to another in order to raise the material to any desired height is of particular disadvantage in connection with the handling of material which is produced in any given standard size or sizes and as to which the market requirements are for certain more or less exact sizes. Further, while it is possible with certain of the types of belt conveyers to incline the conveyers so as to elevate material to some extent, material cannot be transported on these belt conveyers at any inclination closely approaching the vertical. Conveying methods heretofore employed have resulted, in the handling of certain classes of material, in the releasing of considerable dust in work rooms or the like, due to the constant agitation of the material being transported.

The objects of the present invention are to provide a conveyer by means of which material may be moved from one place to another without undue agitation; also to provide a conveyer which will effectively operate to transport the material in substantially any desired direction or inclination to the horizontal or vertical; also to provide a conveyer which requires a relatively small amount of space in which to operate; also to provide a conveyer consisting of relatively few parts and which is inexpensive and relatively easy to install; also to provide a conveyer which will transport granular or lumpy material so as to release practically no dust or the like; also to provide a conveyer which may be readily adapted to discharge at any desired point, without changing or adding to the carrying element; also to provide a conveyer in which the material will be substantially enclosed and held while it is being carried and in which material being conveyed may be readily cleaned of dust or otherwise treated while being carried from place to place. Further objects are to provide improvements in conveyers in the other respects hereinafter set forth and claimed.

In the accompanying drawings:

Fig. 1 is a perspective view of an installation including a conveyer embodying the invention.

Fig. 2 is a sectional elevation of a portion of the conveyer.

Fig. 3 is a side elevation of a portion thereof showing one form of discharge means in inactive position.

Fig. 4 is a side elevation of the form shown in Fig. 3, in material discharging position.

Fig. 5 is a section thereof on line 5—5, Fig. 2.

Fig. 6 is a section thereof on line 6—6, Fig. 2.

Fig. 7 is a section thereof on line 7—7, Fig. 3.

Fig. 8 is a section thereof on line 8—8, Fig. 4.

Fig. 9 is a section on line 9—9, Fig. 1, on an enlarged scale.

Fig. 10 is a plan view thereof as looking down at line 10—10, Fig. 1.

Fig. 11 is a section on line 11—11, Fig. 10.

Fig. 12 is a section on line 12—12, Fig. 10.

Fig. 13 is a section on line 13—13, Fig. 10.

Fig. 14 is a section on line 14—14, Fig. 1.

Fig. 15 is a perspective view of the discharge means shown in Figs. 10 to 13.

In the drawings, A designates a series of bins adapted to receive and store material, B scales or measuring devices for receiving material from the bins, C a pair of mixing drums or crushers in communication with a feed hopper D, E a filling hopper for supplying material to bins A, and F a trough in which the load receiving flight of the conveyer travels. These devices and parts are well known and are shown to illustrate the operation of and facilitate the description of the present invention.

The preferred embodiment of the invention illustrated, generally stated, comprises a belt or carrying element preferably of foraminous material such as wire mesh or the like, together with means for shaping or guiding the belt along certain points in its flight so that material being transported is enclosed therein and gently but firmly held therein.

15 designates an endless belt preferably composed of wire mesh or other foraminous, flexible, metal fabric and having openings of any desired size and number, depending upon the particular material to be handled. The invention includes suitable means for shaping and holding the wire mesh during a portion of its flight so that the material placed thereon will be substantially enclosed within the belt, one of the side edges of the belt folding over adjacent to or upon the other side edge, as best shown in Figs. 5 and 7. The preferred means for accomplishing this purpose comprise a tube or the like 16 which may be constructed of any suitable material and which is of a diameter such that the side edges of the belt are brought close together or are overlapped when the belt is passing through the tube. As shown in Figs. 2 and 5, the tubes 16 may be constructed of corrugated metal. This not only strengthens the tubes and renders them more rigid but lessens the friction between the belt and the inner side of the tube. The end of the tube at which the belt enters is preferably provided with a former or shaping member 17 which gradually guides portions of the belt passing into the tube from a flat form to the cylindrical or tubular form it assumes in the tube. As shown this former or shaping member is preferably in the form of a flaring or funnel-shaped mouth. As illustrated in the drawings, the tubes 16 are preferably constructed of two longitudinal sections held together by bolts 18 or the like so that the tubes may be readily taken apart to facilitate inspections or repairs. The tube 16 may be twisted or shaped as desired and acts not only to maintain the endless belt in substantially tubular form to enclose material therein but also acts as a guide for the endless belt, thereby doing away with a number of guide rollers or the like which would otherwise be required and at the same time housing the endless belt and preventing the discharge of dust or the like from material confined therein.

The unrolled or unshaped portions of the endless belt may be supported upon any suitable number of rollers 19, and the belt may be driven by any suitable means, drive rollers 20 and 21 being shown for this purpose. As illustrated, drive roller 20 may be of the usual frictionally gripping type and drive roller 21 provided with teeth or the like adapted to enter the openings between the wires of the belt.

In order to discharge material from the conveyer, it is necessary to force the adjacent edges of the belt apart so as to permit the material to be released therefrom. Any suitable means may be employed for this purpose; in case the conveyer is being operated with these meeting edges downward, it is only necessary to force the edges apart to permit the material to drop out, and in case the meeting edges are on the upper side of the endless conveyer, it is necessary to force the edges of the belt apart, flatten the belt out and tilt the flattened belt. This is preferably accomplished by exerting pressure on the side of the belt opposite to the meeting edges to flatten the belt, thereby causing the belt to open. In Figs. 3, 4, 7 and 8, I have illustrated one form of discharge device which may be used for discharging material from the belt. This device comprises hinged plates 22 positioned beneath a section of the belt, and bell crank levers 23 and 24 connected through means of links 23[a] and 24[a] to the plates, the levers being of unequal lengths and having a handle 25 whereby when the handle is pulled down the plates will be forced upwardly and tilted, forcing the belt open and tilting it in the manner shown in Fig. 8, so that material contained therein will discharge. At the points where it is desired to discharge the material, a section of the tube 16 is omitted as shown in Figs. 3 and 4, and the levers 23 and 24 may be suitably mounted on a member 25[a] connecting the adjacent ends of the tube sections as shown in those figures. It is desirable that at the discharge points the adjacent ends of the tube 16 be provided with shaping members so that the movement of the belt to and from rolled or tubular form will be gradual, thereby avoiding any severe strain which may be placed upon the belt at the points where the tube section is omitted.

In Figs. 10–13 and 15 there are shown discharge devices for causing the conveyer to discharge when it is traveling with its meeting or overlapping edges at the side. These devices comprise a pair of guide plates 26 which are hinged to a roller or other member 27 which is pressed against the closed side of the belt at the discharging point to cause the belt to flatten out and open, the plates 26 acting to guide the belt and prevent strain at the point where it passes over the roller. The preferred means for moving the roller to and from material discharging position comprise a pair of arms 27[a] and a lever 28 connected to the arms.

29 designates discharge aprons connected to the tubes at the discharging points for the purpose of guiding the material discharged. 30 designates tension rollers for adjusting the tension of the endless belts.

At any desired point or points the tube 16 may be placed in communication with a suction fan or blower or the like, to permit of dust being blown or withdrawn from the material as it is being conveyed or of the material being treated with any desired media. In the embodiment illustrated 31 designates a fan casing housing a suction fan and in communication with tube 16 through means of a duct 32.

The conveyer may be enclosed in tube 16 for substantially its entire length if desired so as to be practically dustless in operation, or, as illustrated, may be provided with a plurality of loading and discharge points. In the embodiment illustrated, the belt travels flatwise in the trough F and receives material from the devices B beneath bins A. The belt travels toward the right of Fig. 1 and enters tube 16 where the belt is formed to substantially cylindrical shape as described. As the portions of the belt pass the suction fan in housing 31, any dust in the material may be withdrawn through the openings in the belt. The belt then travels upwardly and over to a position to discharge into hopper D. Passing from hopper D the belt moves beneath filling hopper E and may receive charges of material therefrom, which it discharges as may be desired into any one of the bins A. After passing over bins A, the belt travels downwardly to the trough beneath bins A, to again receive material from these bins. In this manner one conveyer can be used to both load and unload.

The use of wire mesh or the like as the carrying element of the conveyer system and the shaping and enclosing tube or conduit permits the conveyer to be run diagonally across a building or the like, to be spiraled around bins or tanks and is practical to install in places where there is not sufficient space for the straight flights, right angle turns and the like of other types of conveyers. By enclosing the wire mesh except at one or two loading and discharge points, the conveyer is rendered practically dustless. The conveyer is particularly adapted to carry wet material as the water can drain off through the wire mesh and if desired, the material can be dried by introducing blasts of heated air into the tube. The use of wire mesh permits of the removal of all dust, the proper sized material being retained and enveloped by the wire mesh, and a suction or blast of sufficient strength to effectively remove all dust can be applied without disturbing the material of proper sizes. As it is not necessary to lengthen the wire mesh belt to provide additional discharge points, discharge and loading gates can be placed at any desired point along the run of the conveyer at any time, the sectional construction of the tubes or conduits facilitating the removal of the enclosing tube to permit such provision.

I claim as my invention:—

1. In a conveyer, an endless conveying element, means for driving said conveying element, and a shaping, guiding and enclosing tube in which said endless member travels.

2. In a conveyer, an endless wire mesh belt, a shaping and guiding tube in which said belt travels, and means for driving said belt.

3. In a conveyer, a flexible, foraminous conveying element, means for driving said conveying element, and means for shaping said conveying element during a portion of its movement to enclose material placed thereon.

4. In a conveyer, the combination of a flexible, foraminous conveying element, means for driving said conveying element, and means for shaping said conveying element during a portion of its movement to fold said conveying element about material placed thereon.

5. In a conveyer, the combination of a flexible, foraminous conveying element, means for driving said conveying element, and a guiding and enclosing tube in which said conveying element travels during a portion of its flight.

6. In a conveyer, the combination of an endless carrying element of formainous material, means for driving said element, and means for shaping and guiding said endless carrying element at certain points in its flight to enclose material therein.

7. In a conveyer, the combination of an endless belt of foraminous material, means for driving said belt, means for shaping said belt at certain points in its flight to substantially tubular shape to enclose material placed therein, and means for opening said tubular shaped portion to discharge material therefrom.

8. In a conveyer, the combination of an endless belt of foraminous material, means for driving said belt, means for shaping said belt at certain points in its flight to substantially tubular shape to enclose material placed therein, means for opening said tubular shaped portions at certain points above said conveyer for discharging material therefrom, and means for opening said tubular shaped portions at other points to receive material to be conveyed.

9. The combination of a flexible, foraminous and normally flat conveying element, means for driving said conveying element, and means for shaping said conveying element during a portion of its flight to enfold material placed thereon to be carried.

10. The combination of a flexible, foraminous and normally flat conveying element, means for driving said conveying element, means for shaping said conveying element during a portion of its flight to enfold material placed thereon to be carried, and means for causing said conveying element to unfold at predetermined points in its flight to discharge material therefrom.

11. The combination of a flexible, foraminous and normally flat conveying element, means for driving said conveying element, means for shaping said conveying element during a portion of its flight to enfold material placed thereon to be carried, and means for unfolding and tilting said conveying element at predetermined points in its flight to discharge material therefrom.

12. In a conveyer, the combination of a normally flat, flexible, endless conveying element adapted to receive material to be conveyed, means for driving said endless conveying element, means for shaping said conveying element into substantially tubular form at certain points in its flight to enclose the material therein, with the side edges of said conveying element on the upper side of said tube, means for guiding and twisting said shaped conveying element so that the side edges extend along the side thereof at predetermined points in its flight, and means for opening said shaped element at said last mentioned points to discharge the material therefrom.

13. In a conveyer, an endless foraminous conveying element, a shaping and guiding tube in which said endless member travels and means for creating a draft through a portion of said tube for removing dust from material being conveyed therethrough.

14. In a conveyer, a flexible conveying element adapted to receive material to be conveyed, means for driving said conveying element, means for folding said carrying element to substantially tubular form to enclose material therein, and means for applying pressure to said folded conveying element to cause it to open to release material therefrom.

15. In a conveyer, a flexible conveying element adapted to receive material to be conveyed, means for driving said conveying element, means for folding said carrying element to substantially tubular form to enclose material therein, and a discharge device comprising a transverse member adapted to be pressed against a side of said folded conveying element to cause said folded element to open to release material therefrom.

16. In a conveyer, a flexible conveying element adapted to receive material to be conveyed, means for driving said conveying element, means for folding said carrying element to substantially tubular form to enclose material therein, a discharge device comprising a transverse member adapted to be pressed against a side of said folded conveying element to cause said folded element to open to release material therefrom, and guide plates hinged to said transverse member.

17. In a conveyer, a flexible conveying element adapted to receive material to be conveyed, means for driving said conveying element, means for folding said conveying element to substantially tubular form to enclose material therein, and a member arranged transversely of said tube and movable from a position adjacent one side of said tube to a position adjacent the opposite side of said tube to cause said conveying element to be unfolded.

18. In a conveyer, a flexible conveying element for receiving and carrying material, and a tube for enclosing a portion of said element and folding said element about said material, said tube comprising two longitudinal sections, and means for connecting said sections.

ALBERT G. SCHWINGER.